(12) United States Patent  (10) Patent No.: US 8,120,190 B2
Bravo  (45) Date of Patent: Feb. 21, 2012

(54) SHOPPING CART WITH A SELF-CHARGING SYSTEM

(75) Inventor: Luis Eduardo Bravo, Atlanta, GA (US)

(73) Assignee: NCR Corporation, Duluth, GA (US)

( * ) Notice: Subject to any disclaimer, the term of this patent is extended or adjusted under 35 U.S.C. 154(b) by 688 days.

(21) Appl. No.: 12/240,612

(22) Filed: Sep. 29, 2008

(65) Prior Publication Data

US 2010/0078903 A1  Apr. 1, 2010

(51) Int. Cl.
  *H02K 7/18* (2006.01)
  *F03G 1/00* (2006.01)
(52) U.S. Cl. .................... 290/1 R; 185/37; 185/41 WW
(58) Field of Classification Search .................. 290/1 R; 185/37, 40 B, 40 R, 41 A, 41 C, 41 WW; 310/75 B
  See application file for complete search history.

(56) References Cited

U.S. PATENT DOCUMENTS

| 1,112,595 | A | * | 10/1914 | Brown | 180/165 |
| 4,193,223 | A | | 3/1980 | D'Andrade et al. | |
| 4,813,509 | A | * | 3/1989 | Harris | 180/165 |
| 4,973,952 | A | | 11/1990 | Malec et al. | |
| 5,818,132 | A | | 10/1998 | Konotchick | |
| 6,502,669 | B1 | * | 1/2003 | Harris | 188/1.12 |
| 6,565,015 | B2 | | 5/2003 | Leer et al. | |
| 6,774,503 | B1 | | 8/2004 | Chen | |
| 6,928,343 | B2 | | 8/2005 | Cato | |
| 6,935,987 | B1 | * | 8/2005 | Booth, Jr. | 476/4 |
| 7,009,350 | B1 | * | 3/2006 | Gold | 318/142 |
| 7,350,607 | B2 | | 4/2008 | Park et al. | |
| 7,391,123 | B2 | | 6/2008 | Rome | |
| 7,834,471 | B2 | * | 11/2010 | Cripps | 290/1 E |
| 2006/0032687 | A1 | * | 2/2006 | Park et al. | 180/206 |
| 2007/0090702 | A1 | * | 4/2007 | Schiller | 310/75 C |
| 2008/0122227 | A1 | * | 5/2008 | Hammerle | 290/1 R |

* cited by examiner

*Primary Examiner* — Quyen Leung
*Assistant Examiner* — Thomas Truong
(74) *Attorney, Agent, or Firm* — Paul Maginot et al.; Michael Chan

(57) ABSTRACT

A shopping cart is equipped with an electrical/electronic component(s), such as a shopping assistant, that is electrically powered by a rechargeable power supply. A system is provided for continuously recharging the power supply as the shopping cart is propelled by the customer. In one embodiment, the wheels of the shopping cart are linked to a potential energy storage component, such as a coil spring. The spring is wound with each movement of the shopping cart, regardless of the distance that the cart travels. When the coil spring has been wound to a pre-determined torque, the spring is released to drive an input to an electrical generator. Once the potential energy in the spring has been dissipated the winding cycle begins again.

10 Claims, 2 Drawing Sheets

SHOPPING CART WITH A SELF-CHARGING SYSTEM

The present disclosure relates to shopping carts having electrical or electronic components carried by the cart. More particularly, the disclosure pertains to a system for providing continuous electrical power to the components through normal use of the shopping cart.

In the modern shopping environment, the traditional shopping cart has been outfitted with electronic components, often to assist the customer in the shopping experience. Some electronic components are provided to track the movement of the shopping cart throughout a store or to act as an anti-theft deterrent. In other cases, the electronic component is in the form of a "shopping assistant" that provides customers with timely information as they move through the retail establishment. For instance, the electronic shopping assistant may provide an interactive map of the store to facilitate locating a particular product. The assistant may allow the customer to upload a shopping list or may provide shopping suggestion s based on a customer identification. In some cases, the shopping assistant integrates with point-of-sale (POS) display that provides sales and marketing information to the shopper. A hand-held UPC code scanner may also be connected to the electronic shopping assistant to allow the customer to conduct a price check.

The electronic shopping assistant is typically powered by a rechargeable battery that is recharged when the shopping carts are stored at the end of the business day. In an establishment with many shopping carts, such as a large grocery store, the logistics of keeping dozens of electronic shopping assistants fully charged throughout the business day is complicated. Moreover, the need to fully recharge every unit every day leads to a significant utility charge for the establishment.

One approach to alleviate these problems is to equip the "electronic" shopping cart with a wheel-driven generator. In this approach, one or more wheels or axles of the shopping cart are linked by a gear train to an electrical generator. As the shopping cart is moved by the customer, the rotation of the wheels powers the generator, which delivers electricity to the rechargeable battery of the electronic component(s). One drawback of this approach is that the drag associated with driving the power generation components can make the shopping cart difficult for many customers to push. Another significant drawback relates to the nature of the shopping experience. More particularly, the typical shopper frequently stops and starts, often moving the shopping cart only a few feet at a time. Unless the drive between the cart wheels and the generator is geared up significantly the generator cannot be driven at a sufficient speed to produce any appreciable electric current. Even with sufficient gearing, the generator may only be driven for a matter of seconds during the stop and go travel of the shopping cart.

What is needed is a system for providing consistent electrical power to the electronic components on board a shopping cart. More particularly, the need relates to a system and method for effectively recharging the power supply of the electronic component(s) as the shopping cart is in normal use.

SUMMARY

In order to address this need, a system and method is provided that stores potential energy as the shopping cart is propelled by the customer. When a sufficient amount of potential energy has been stored, the energy is released to drive a generator to thereby provide an electric current to a rechargeable power supply of cart-mounted electric/electronic component(s).

In one embodiment, the wheels of the shopping cart are linked to a potential energy storage component, such as a coil spring. The spring is wound with each movement of the shopping cart, regardless of the distance that the cart travels. When the coil spring has been wound to a pre-determined torque, the spring is released to drive an input to an electrical generator. Once the potential energy in the spring has been dissipated the winding cycle begins again.

In another embodiment, the weight of the product being purchased is used as the potential energy storage component. In this embodiment, the shopping cart includes a product basket that is mounted within the mobile frame of the act. The product basket is mounted to drop under the force of gravity when the weight of the product in the basket reaches a pre-determined value. The product basket is linked to the input of an electrical generator, such as through a rack and pinion gear train. Springs may be provided to restore the product basket to its free position when all of is contents have been removed.

DETAILED DESCRIPTION

Figure 1:
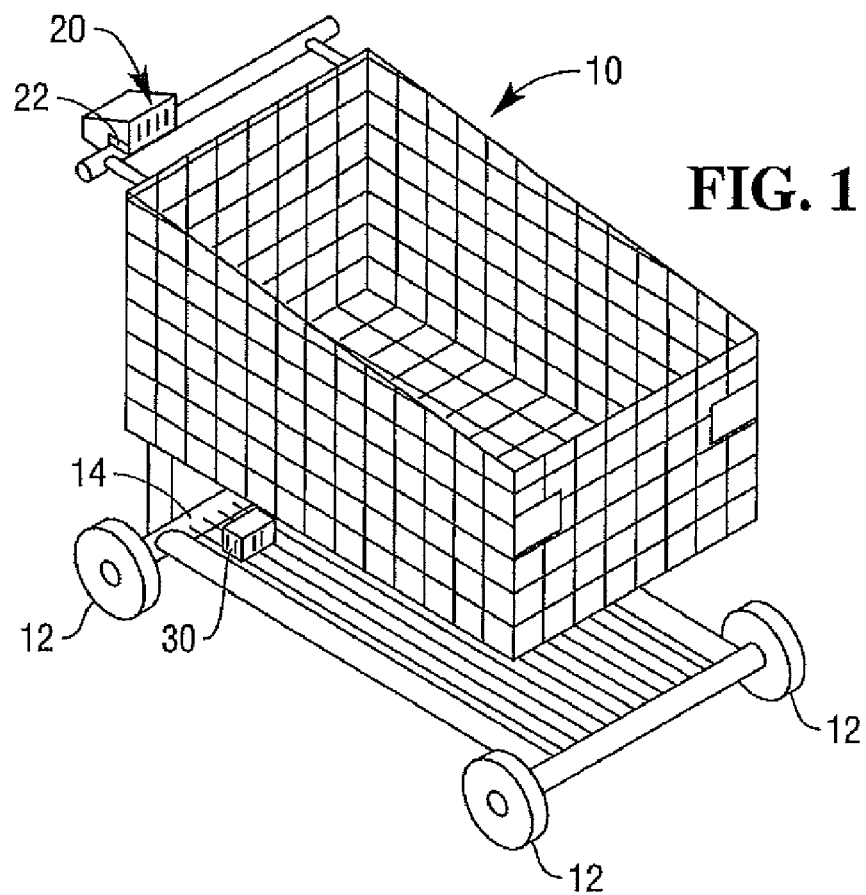
FIG. 1 is a perspective view of a shopping cart equipped with an electrical or electronic component suitable for use with the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
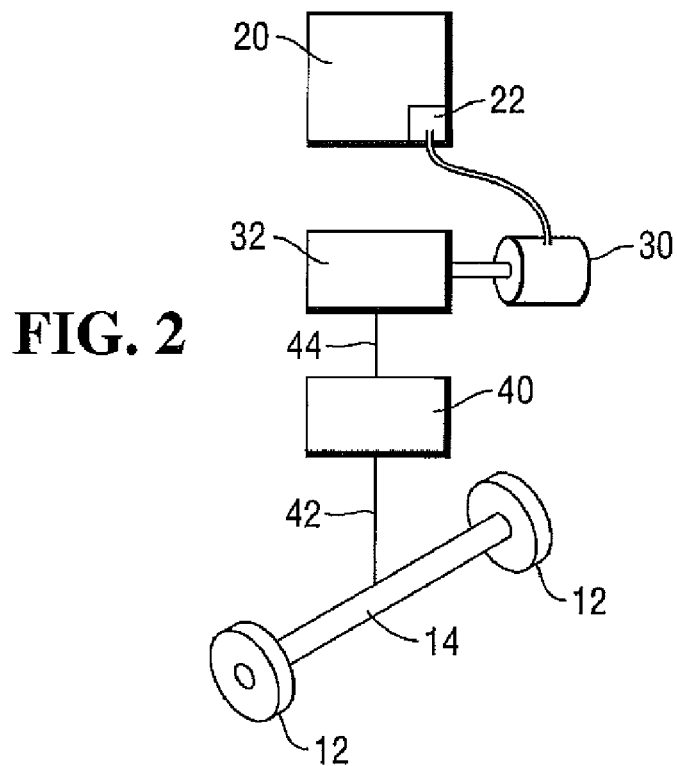
FIG. 2 is a schematic representation of the self-charging components disclosed herein.

According to one embodiment, a shopping cart 10 is provided with an electrical or electronic component 20 mounted thereto, as shown in FIG. 1. The component may be, for example, a multi-function electronic shopping assistant. The component 20 is powered by a rechargeable power supply 22 (FIG. 2), such as a rechargeable lithium or NiCad battery array. The cart includes four wheels 12 with the front wheels being mounted on casters or swivels to facilitate steering. The rear wheels are preferably mounted on a common axle 14 to facilitate integration with the power generation system disclosed herein.

In accordance with the disclosed embodiment, the rechargeable power supply 22 is provided with electrical recharging current by a generator 30 through appropriate conditioning circuitry. The generator is driven by a drive link 32. A potential energy storage component 40 is connected between the shopping cart wheels 12 and the drive link 32 for the generator. In one preferred embodiment, the potential energy storage unit is connected to a common axle 14 for the wheels by an input mechanism 42. An output mechanism 44 converts the stored potential energy to kinetic energy to drive the drive link 32.

In one embodiment, the nature of the generator 30 is determined by the movement of the drive link 32. For instance, if the drive link provides a rotational movement, the generator 30 incorporates a rotor. On the other hand, if the drive link 32 provides a linear movement, the generator incorporates a linearly translated magnet, for example. In the embodiment illustrated in FIGS. 2-3, the generator is a rotary type so the input to the generator is rotational.

Figure 3:
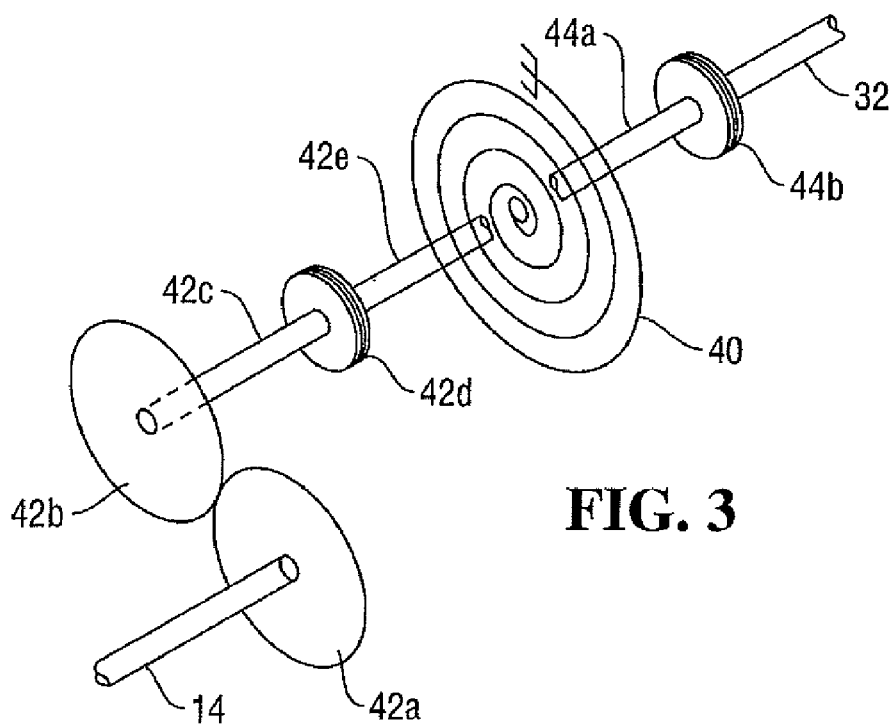
FIG. 3 is a schematic representation of a potential energy storage system according to one embodiment disclosed herein.

In the illustrated embodiment, the potential energy storage component 40 is a spring, and more particularly a coil spring. It is understood that the component 40 may include one or more springs, but care must be taken that the force required to store potential energy in the spring array is not excessive so that the customer must strain to push the shopping cart. As shown in FIG. 3, the coil spring 40 is connected to the shopping cart axle 14 by an input mechanism 42 that includes a gear train, with an axle-mounted gear 42a that meshes with a driven gear 42b. The two gears 42a, 42b may be sized to provide a gear ratio that is optimized for storing potential energy in the spring without causing undue load on the customer pushing the cart. The driven gear 42b includes a shaft segment 42c that is connected to a one-way clutch 42d. The clutch 42d is connected to the spring 40 by another shaft segment 42e.

Rotation of the cart wheels 12 rotates the axle 14 and the axle gear 42a, which in turn rotates the driven gear 42b and shaft segment 42c. The input mechanism 42 thus converts the kinetic energy of the moving shopping cart to potential energy. When the potential energy is being stored, the one-way clutch transmits the rotation of shaft segment 42c to the shaft segment 42e. As the shaft segment 42e rotates, it winds the coil spring 40. Each rotation of the cart wheels contributes to winding the coil spring 40. In the illustrated embodiment, the gearing 42a, 42b only contributes to winding the spring only when the shopping cart is propelled forward. The one-way clutch 42d effectively disconnects the shaft segment 42c from the coil spring when the shaft rotates in the opposite direction, such as when the shopping cart is pulled backward rather than pushed forward. Alternatively, the gearing may be modified to also contribute to the storage of potential energy when the cart is moved in backward.

The one-way clutch 42d is also preferably configured to disengage or slip when the coil spring 40 is fully wound. Thus, the clutch 42d may be configured to disengage when the torque of the spring reaches a predetermined value. When the clutch 42d is disengaged the spring is isolated form the rotation of the cart wheels.

The disclosed system further provides a mechanism for releasing the potential energy stored in the fully wound coil spring. In one embodiment, the output mechanism 44 includes a shaft segment 44a that is connected to the drive link 32 through a one-way clutch 44b. In one specific embodiment, the shaft segment 44a of the output mechanism 44 is integral with the shaft segment 42e of the input mechanism 42. The two clutches transmit rotation in opposite directions—the first clutch 42d transmits rotation in the winding direction for the spring, while the second clutch 44b transmits rotation in the un-winding direction. Thus, with respect to the clutch 44b, the output shaft segment 44a is disconnected from the drive link 32 as the spring is being wound and is connected to the drive as the spring unwinds.

The two one-way clutches 42d and 44b connect or disconnect the coil spring from the input or output according to the stored potential energy in the spring. In the preferred embodiment, when the coil spring is wound to a predetermined torque, the input clutch 42d disconnects and the output clutch 44b substantially simultaneously connects. As the coil spring unwinds the output clutch transmits rotation to the drive link 32, which in turn drives the generator 30. In one specific embodiment, the output clutch 44b may be a centrifugal clutch that engages at a certain rotational speed. Thus, when the input clutch 42d disengages when it encounters the predetermined spring torque, the coil spring 40 begins to unwind and the output shaft segment 44a begins to rotate. At a certain rotational speed the centrifugal components of the clutch engage the drive link 32 and connects the coil spring to the generator. While the coil spring is unwinding, it is rotating in the opposite direction to the input rotation, so the input clutch 42d remains disengaged. Once the coil spring is fully unwound or nearly fully unwound, the input clutch 42d can re-engage and the cart wheels 14 start to recharge the potential energy storage component 40. In some embodiments, the input clutch 42d can be configured to provide some braking to the output rotation of the spring and is operable to prevent the coil spring 40 from oscillating at its fully unwound position.

In an alternative embodiment, the potential energy storage component 40 may incorporate a linear extension or compression spring. In this embodiment, drive link 32 translates rather than rotates and the generator 30 employs a linear magnet or equivalent to generate electricity. The linear spring is either extended or compressed as the cart wheels are rotated until a predetermined spring force has been reached. At that predetermined force, the linear spring is disengaged from the cart wheels and the potential energy is released as the spring drives the drive link 32. In this embodiment, the linear spring may be permitted to oscillate until all motion stops and the spring has returned to its free height/length, with appropriate modification to the generator 30 to generate electricity during the forward and backward stroke of the drive link. Once the potential energy has been removed from the spring, the spring is re-engaged to the cart wheels. In this embodiment, the input mechanism 42 may incorporate a rotary-to-linear motion converter, such as a rack and pinion structure, to convert rotation of the wheels 12 or axle 14 to linear translation of the spring. In lieu of a clutch mechanism, the input mechanism may incorporate mechanical stops that disconnect the rack from the spring and allow the rack to return to its initial position to re-engage the spring at its unloaded free height/length.

It is contemplated that the present apparatus may be implemented with individual wheels or with axle-mounted wheels as in the illustrated embodiment. It is further contemplated that multiple potential energy storage components 40 may be provided, all driving a common generator 30. In this modification, the storage components can be sequentially engaged to the generator 30 so that as one storage component 40 is driving the generator, other storage component(s) can be accumulating potential energy. With this approach, the generator may be almost continuously operating, as the multiple storage components alternate between loading and unloading the potential energy. The circuitry associated with the generator 30 and the rechargeable power source 22 may be adapted so that the generator directly powers the electrical/electronic components when the power source is fully charged.

In the illustrated embodiment, the potential energy storage component is a coil spring. In an alternative embodiment described herein, the spring is an axially loaded spring, such as a tension or a compression spring. In other alternatives, the spring may be a torsion bar, a plate spring, a leaf spring or other form of spring.

In yet another approach, the potential energy storage component includes a weighted element that is raised to increase its potential energy. The element is then released and coupled to drive the generator as it drops. For instance, the input link 32 may be a spool with a cable wound thereon that supports a free weight. Rotation of the wheels of the shopping cart rotates the spool until the cable is completely wound onto the spool, at which point the free weight has been raised to its maximum height within the cart. At this point, the weight is allowed to drop to rotate the spool as the weight falls.

Figure 4:
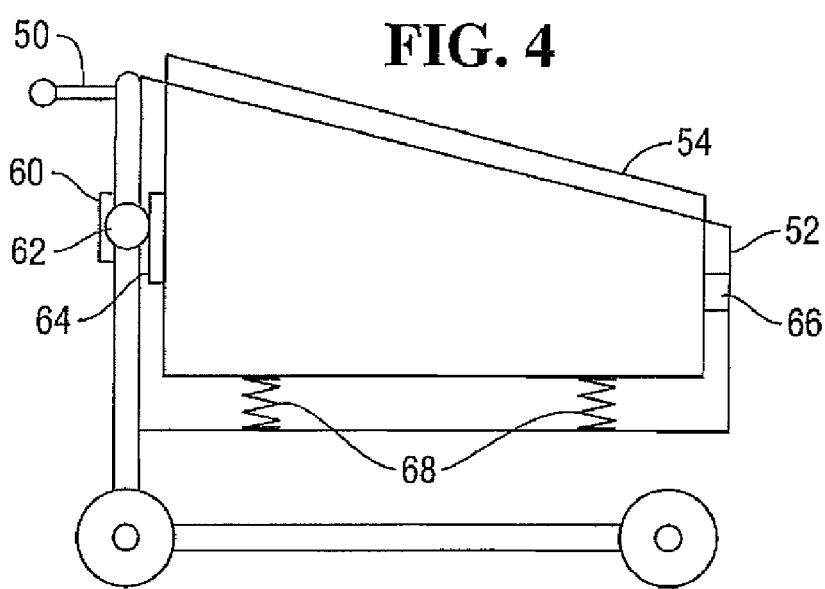
FIG. 4 is a representation of a shopping cart equipped with self-charging components according to a further embodiment.

In a further alternative depicted in FIG. 4, a shopping cart 50 is modified to utilize the products being carried in the cart as the potential energy storage component. The cart includes a product basket 54 mounted within the mobile frame 52 so that it can translate vertically within the cart. The basket is sized to hold a quantity of product being purchased. The basket is held in the free position shown in FIG. 4 by a latch arrangement 66 disposed between the frame 52 and the basket 54.

The shopping cart 50 is used in a traditional manner as the customer fills the basket 54 with product. Once the weight of the product reaches a predetermined value, the latch arrangement 52 trips allowing the product basket 54 to drop under the force of gravity. The potential energy in the form of the weight of the product and the basket is thus converted to kinetic energy by the vertical movement of the basket. The basket is linked to an electrical generator 60, such as by a gear train. The gear train may include a pinion gear 62 mounted to drive the generator and a rack 64 mounted to the product basket. However, other links are contemplated that can drive the generator by the downward movement of the product basket 54 within the shopping cart 50.

The shopping cart 50 may incorporate a return device 68 arranged to restore the basket 54 to its free height once all the products have been removed from the basket. In one embodiment, the return device may include springs 68, a pneumatic/hydraulic lifter, or equivalent structure. Alternatively, the basket may be manually lifted into engagement with the latch arrangement 66.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, in the illustrated embodiment the inventive system is mounted on a shopping cart for a grocery store or other retail establishment. However, other human powered vehicles may benefit from the present system to provide electrical energy to a rechargeable power supply.

In addition, the illustrated embodiment of the self-recharging system disclosed herein contemplates that the cart is a wheeled vehicle. However, the human propelled vehicle may be slid, rather than rolled on wheels. In this instance, the input mechanism 42 of the illustrated system may incorporate its own ground-engaging wheel that is rotated as the vehicle is slid.

What is claimed is:

1. A wheeled shopping cart having an electrically powered component mounted thereon, the component having a rechargeable electrical power supply, the wheeled shopping cart comprising:
    an electrical generator coupled to the power supply to provide electrical energy to recharge the supply;
    a potential energy storage component coupled between at least one wheel of the shopping cart and the electrical generator, the storage component configured to store potential energy by rotation of the at least one wheel and further configured to drive the generator by converting the stored potential energy to kinetic energy, wherein the potential energy storage component comprises a coil spring; and
    an input mechanism coupled between the coil spring and the at least one wheel of the shopping cart, wherein (i) the input mechanism is configured to wind the coil spring as the at least one wheel rotates, and (ii) the input mechanism includes a one-way clutch to transmit rotation in only one direction between the coil spring and the at least one wheel.

2. The wheeled shopping cart according to claim 1, wherein the input mechanism includes a gear train rotatably coupled between the at least one wheel and the coil spring.

3. The wheeled shopping cart according to claim 1, wherein the one-way clutch is configured to disengage when the coil spring is wound to a pre-determined torque.

4. The wheeled shopping cart according to claim 3, wherein the clutch slips at the pre-determined torque.

5. A wheeled shopping cart having an electrically powered component mounted thereon, the component having a rechargeable electrical power supply, the wheeled shopping cart comprising:
    an electrical generator coupled to the power supply to provide electrical energy to recharge the supply;
    a potential energy storage component coupled between at least one wheel of the shopping cart and the electrical generator, the storage component configured to store potential energy by rotation of the at least one wheel and further configured to drive the generator by converting the stored potential energy to kinetic energy, wherein the potential energy storage component comprises a coil spring; and
    an output mechanism coupled between the coil spring and the electrical generator, wherein (i) the output mechanism is configured to drive the generator as the coil spring unwinds, (ii) the output mechanism includes a rotatable shaft coupled between the coil spring and the generator, and (iii) the output mechanism includes a one-way clutch integrated into the rotatable shaft to transmit rotation to the generator in only one direction.

6. A shopping cart having an electrically powered component mounted thereon, the component having a rechargeable electrical power supply, the shopping cart comprising:
    an electrical generator coupled to the power supply to provide electrical energy to recharge the supply;
    a potential energy storage component mounted within the shopping cart and operably coupled to drive the electrical generator, the storage component configured to store potential energy and to drive the generator by converting the stored potential energy to kinetic energy, wherein the potential energy storage component comprises a coil spring;
    an input mechanism coupled between the coil spring and the at least one wheel of the shopping cart, wherein (i) the input mechanism configured to wind the coil spring as the at least one wheel rotates, and (ii) the input mechanism includes a one-way clutch to transmit rotation in only one direction between the coil spring and the at least one wheel; and
    an output mechanism coupled between the coil spring and the electrical generator, wherein (i) the output mechanism is configured to drive the generator as the coil spring unwinds, (ii) the output mechanism includes a rotatable shaft coupled between the coil spring and the generator, and (iii) the output mechanism includes a one-way clutch integrated into the rotatable shaft to transmit rotation to the generator in only one direction.

7. A method for recharging a rechargeable power supply for an electrical/electronic component mounted on a wheeled shopping cart comprising:

providing an electrical generator mounted on the shopping cart and coupled to the power supply to recharge the power supply;

periodically connecting a first one-way clutch to convert the kinetic energy of the rotation of at least one wheel of the shopping cart to potential energy;

storing the potential energy in at least one spring carried by the shopping cart; and periodically connecting a second one-way clutch to convert the potential energy to kinetic energy to drive the electrical generator.

8. The method according to claim 7, wherein:

the storing step includes winding a coil spring carried by the shopping cart; and the step of periodically connecting a second one-way clutch to convert includes unwinding the coil spring.

9. The method according to claim 7, wherein:

the storing step includes storing potential energy in two or more springs carried by the shopping cart.

10. The method according to claim 7, wherein the storing step occurs for one of two or more springs while the periodically connecting a second one-way clutch to convert step occurs for another one of the two or more springs.

* * * * *